UNITED STATES PATENT OFFICE.

ELEAZAR BROWN, JR., OF BINGHAMTON, NEW YORK.

IMPROVEMENT IN LUBRICATING COMPOUNDS.

Specification forming part of Letters Patent No. 13,211, dated July 10, 1855.

*To all whom it may concern:*

Be it known that I, ELEAZAR BROWN, Jr., of Binghamton, in the town of Chenango, county of Broome and State of New York, have discovered a lubricating compound that may be used instead of oil and waste in lubricating the journals of railroad-cars, locomotive-engines, and also the journals of all kinds of machinery used in mills and manufactories; and I do hereby declare that I use the following ingredients in forming my said compound—to wit, fat salt-pork, saltpeter, (nitrate of potash,) and common hard soap—and that I compound them in about the following proportions, viz: fat salt-pork, nine parts; common hard soap, eight parts; saltpeter, (nitrate of potash,) two parts; equivalents, one hundred parts.

The nature of my compound is such that the ingredients of which it is composed can be kept in close contact with the journal when revolving, thereby constantly lubricating the surface of both journal and liner, so that neither is allowed to become dry, and prevents them from being heated by friction, and also the cutting or abrasion on bearing-surfaces.

The fat salt-pork forms the basis of my compound, and is prepared by removing all the lean parts or muscle and compounding it with the saltpeter in a cold state. The common hard soap I compound with the fat salt-pork and saltpeter when packing them in the box. In packing I embed about one-half of the journal in the fat salt-pork and saltpeter, and then introduce the common hard soap, either directly under the journal or upon the sides of the journal, in close contact with the other packing, and I use it both for the lubricating properties it contains and also to prevent any dirt or dust that may get into the box from traveling with the journal in its revolutions. The fat salt-pork and common hard soap supply all the lubricating properties contained in my said compound.

The saltpeter (nitrate of potash) I introduce or use as a refrigerator, the effect of which in improving the lubricating compound consists in cooling the surfaces of both journal and liner continually exposed to friction. The principle of liquefactions in absorbing heat is demonstrated in the various freezing-mixtures frequently employed. In the present instance the pulverized potash becomes thoroughly intermixed with the tissue of the pork, and as it dissolves in the fluid portion of the pork it absorbs the heat from the surrounding surfaces and keeps both journal and liner cool, thereby combining two important considerations, viz: first, an ordinary lubricating compound equal in all respects to oil; second, the continual solution of the nitrate of potash, which abstracts whatever heat may be engendered, thereby preserving a uniform and moderate temperature. The nitrate of potash I therefore use as a refrigerator, which, when combined with salt-pork or any similar oleaginous animal substance and common hard soap, establishes a principle and produces an effect entirely new and distinguishes it from anything ever before discovered, known, or used.

What I claim as my invention and improvement, and desire to secure by Letters Patent, is—

The use and application of saltpeter, combined with common hard soap and fat salt-pork or any similar oleaginous animal substance, thereby forming an anti-frictional refrigerating lubricating compound adapted to the purpose of lubricating the journals of railroad-cars, locomotive-engines, and also the journals of all kinds of machinery, as hereinbefore described.

ELEAZAR BROWN, JR.

Witnesses:
GEO. PARK,
THOMAS WEBB.